United States Patent
Purvis et al.

(10) Patent No.: US 8,171,754 B2
(45) Date of Patent: May 8, 2012

(54) REDUCED ALLOY BUSHING FLANGE

(75) Inventors: David F. Purvis, Newark, OH (US);
Byron L. Bemis, Newark, OH (US);
Anthony P Oakleaf, New Albany, OH (US);
William L Streicher, Granville, OH (US); Philippe Simon, Xhoris (BE);
Terry L. Anderson, Thornville, OH (US); Jack Wallace, Nashport, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 853 days.

(21) Appl. No.: 11/980,293

(22) Filed: Oct. 30, 2007

(65) Prior Publication Data
US 2009/0107183 A1    Apr. 30, 2009

(51) Int. Cl.
*C03B 5/44* (2006.01)
(52) U.S. Cl. ............. 65/498; 65/492; 65/495
(58) Field of Classification Search .......... 65/471, 65/495, 498, 492
See application file for complete search history.

(56) References Cited

U.S. PATENT DOCUMENTS

| | | | |
|---|---|---|---|
| 3,164,458 A | 1/1965 | Mitchell | |
| 4,155,731 A | 5/1979 | Byrnes et al. | |
| 4,397,665 A | 8/1983 | Harris | |
| 4,518,406 A | 5/1985 | Perkins et al. | |
| 4,536,202 A | 8/1985 | Perkins et al. | |
| 4,634,460 A | 1/1987 | Fowler | |
| 4,717,411 A | 1/1988 | Fowler | |
| 5,110,333 A | 5/1992 | McCormick | |
| 5,244,483 A | 9/1993 | Brosch et al. | |
| 5,749,933 A | 5/1998 | Ghorpade et al. | |
| 5,879,427 A * | 3/1999 | Palamara | 65/499 |
| 6,196,029 B1 | 3/2001 | Melia et al. | |
| 7,194,874 B1 | 3/2007 | Arterburn | |
| 2003/0000259 A1 | 1/2003 | Bemis | |
| 2003/0145631 A1 | 8/2003 | Sullivan et al. | |
| 2003/0221462 A1 | 12/2003 | Sullivan et al. | |

(Continued)

FOREIGN PATENT DOCUMENTS

WO    WO 03/020655    3/2003

(Continued)

OTHER PUBLICATIONS

International Search Report and Written Opinion from PCT/US08/081777 dated Feb. 5, 2009.

*Primary Examiner* — Queenie Dehghan
(74) *Attorney, Agent, or Firm* — Calfee, Halter & Griswold LLP (57) ABSTRACT

A cooling bushing flange having a reduced amount of precious metal is provided for a glass fiber production apparatus. The flange includes a first portion formed of a precious metal or a precious metal alloy extending outwardly from a bushing and a second portion formed of a non-precious metal. The non-precious metal portion of the flange may be affixed to the precious metal portion by known metal bonding methods. A cooling tube is positioned on the non-precious metal portion to create a thermal seal and prevent molten glass from leaking from the interface of the bushing block and bushing. The precious metal portion of the inventive flange is a fraction of the size of precious metal present in conventional bushing flanges. By reducing the amount of precious metal incorporated in the flange, a significant reduction in the overall cost of the bushing and in the manufacture of glass fibers can be obtained.

11 Claims, 5 Drawing Sheets

U.S. PATENT DOCUMENTS

| | | |
|---|---|---|
| 2005/0092031 A1 | 5/2005 | Johnson |
| 2005/0241342 A1 | 11/2005 | Hanna et al. |
| 2006/0065022 A1 | 3/2006 | Sullivan et al. |
| 2007/0144218 A1 | 6/2007 | Oakleaf et al. |
| 2008/0141727 A1 | 6/2008 | Sullivan et al. |

FOREIGN PATENT DOCUMENTS

| | | |
|---|---|---|
| WO | 09/058994 | 5/2009 |

* cited by examiner

FIG. 5

REDUCED ALLOY BUSHING FLANGE

TECHNICAL FIELD AND INDUSTRIAL APPLICABILITY OF THE INVENTION

The present invention relates generally to a glass forming apparatus, and more particularly, to a flange for a bushing that contains a reduced amount of precious metals or precious metal alloys.

BACKGROUND OF THE INVENTION

Figure 1:
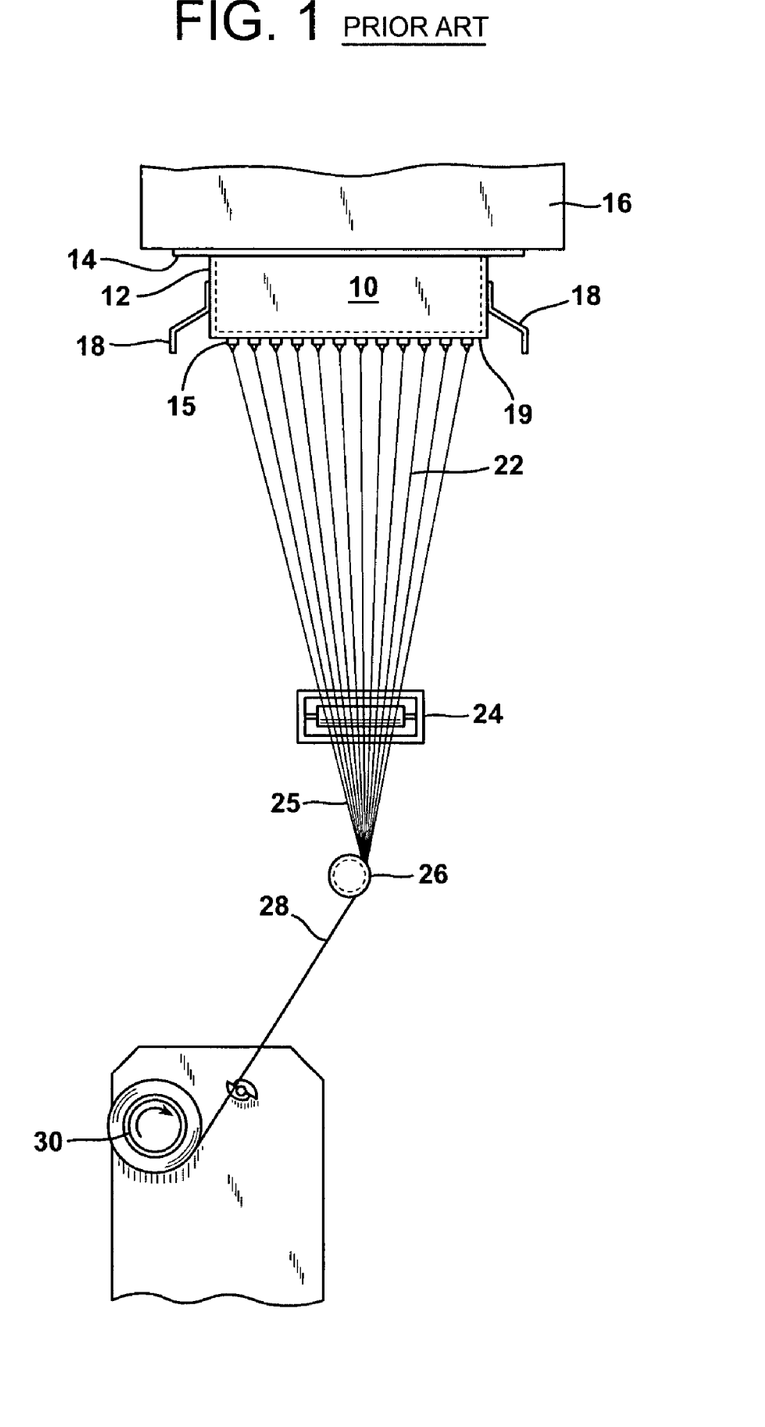
FIG. 1 is a schematic illustration of a conventional glass forming line.

Glass fibers are useful in a variety of technologies. For example, glass fibers are commonly used as reinforcements in polymer matrices to form glass fiber reinforced plastics or composites. Glass fibers have been used in the form of continuous or chopped filaments, strands, rovings, woven fabrics, non-woven fabrics, meshes, and scrims to reinforce polymers. In forming glass fibers, a glass forming material is heated in a glass melting furnace until the glass forming material is degraded to a molten state. The molten glass is passed through a bushing block and a bushing, where it is formed into glass filaments. As shown in FIG. 1, a bushing 10 includes a generally rectilinear shaped sidewall 12 and an outwardly extending flange 14 disposed at the upper portion thereof. The flange 14 is adapted to be secured to a supply of molten glass, such as from a bushing block 16. Bushings 10 are generally electrically heated. In this regard, diametrically disposed terminals or ears 18 are attached to a power source (not shown) to conduct current through the bushing 10, including its sidewalls 12 and bottom plate 19. The bottom plate 19 includes orifices or feeder tips 15 which are in fluid communication with the molten glass. The molten glass is attenuated or otherwise pulled from the tips 15 of the bushing 10 to form glass filaments 22. These glass fibers 22 are coated with a sizing composition, such as by the sizing applicator 24. The sized glass fibers 25 are gathered by a gathering shoe 26 into a glass strand 28. The glass strands may be wound into a package 30.

Figure 2:
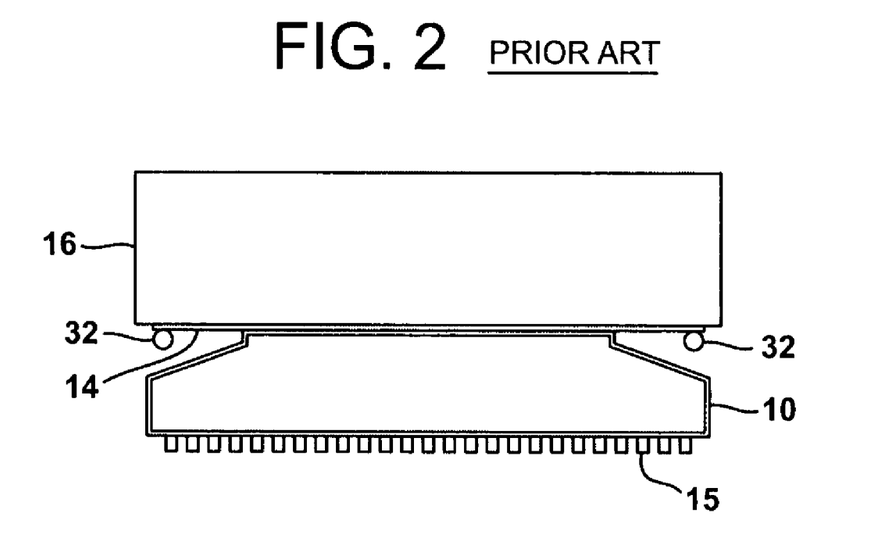
FIG. 2 is a schematic illustration of the positioning of a flange and cooling tube for a conventional bushing.

It is known in the art to use a cooling tube 32, as illustrated in FIG. 2, mounted below the flange 14 to "freeze" the molten glass material and form a seal with the bushing block 16. During operation, water flows through the cooling tube 32 to carry away heat absorbed by the cooling tube 32 and create a cold area that has a temperature that is lower than the temperature at which the molten glass solidifies. When the molten glass reaches the area near the cooling tube 32, it becomes a solid and prevents further flow of the glass material, thereby preventing any molten glass leakage from the bushing 10 or bushing block 16.

Typically, the bushing 10 and flange 14 are formed of a precious metal or a precious metal alloy formed of platinum, rhodium, or palladium. Precious metals have been used to form these components because they can withstand the extreme heat associated with the molten glass. However, precious metals are very expensive and tie up millions of dollars of capital investment. Thus, there exists a need in the art to for a glass forming apparatus that reduces costs associated with the formation of glass fibers.

SUMMARY OF THE INVENTION

It is an object of the present invention to provide an improved flange for use in a glass fiber forming apparatus.

It is another object of the present invention to provide a two piece flange that has a non-precious metal portion connected to the cooling tube.

It is yet another object of the present invention to provide a cooling flange for a bushing in a glass fiber production apparatus that has improved thermal seal forming properties and can be manufactured at a lower cost.

It is an advantage of the present invention that the reduced alloy flange reduces capital investment required for glass filament apparatuses.

It is another advantage of the present invention that the larger contact area of the cooling bushing flange increases heat removal from the bushing and bushing block interface.

It is still another advantage of the present invention that the cooling tube can be spaced outwardly further from the bushing to provide an improved thermal seal that improves the glass fiber forming conditions within the bushing.

It is a further advantage of the present invention that the reduced alloy bushing flange improves the thermal seal between the bushing block and the bushing.

It is also an advantage of the present invention to position the cooling tube further outwardly from the bushing to form a cold seal area that is positioned away from the primary glass flow within the bushing in order to create better fiber forming conditions.

It is a feature of the present invention that the inventive flange has an increased surface area compared to conventional cooling bushing flanges.

It is another feature of the present invention that the cooling tube positioned on the non-precious metal portion of the flange creates a thermal seal to prevent molten glass from leaking from the interface of the bushing block and the bushing.

It is yet another feature of the present invention that the non-precious metal flange portion can be formed from stainless steel or high nickel alloy metals.

It is a further feature of the present invention that the non-precious metal flange portion carries the cooling tube to form a thermal seal.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. It will be understood that when an element is referred to as being "on," another element, it can be directly on or against the other element or intervening elements may be present. The terms "fibers" and "filaments" may be used interchangeably herein.

The present invention relates to a reduced alloy flange for a fiberizing bushing used in a fiber forming process. Fiberizing bushings are normally formed of precious metals, such as platinum or platinum/rhodium alloys, which are very expensive due to the cost of the precious metal and the cost of fabrication. The inventive bushing flange utilizes one or more non-precious metals to reduce the amount of precious metal included in the flange, and thereby reduce the overall fiber manufacturing cost. Additionally, the reduced alloy flange improves the seal between the bushing block and the bushing and increases heat removal from the bushing and bushing block.

Figure 3:
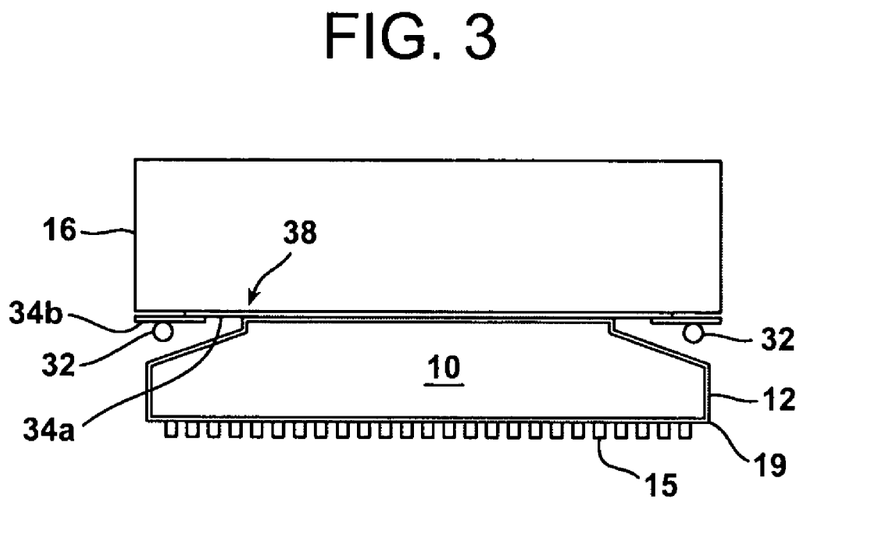
FIG. 3 is a schematic illustration of a bushing block, bushing, and cooling flange according to the present invention.

Precious metal bushings are used to make fibers from a molten glass material. Referring to FIG. 3, the bushing 10 is formed with a sidewall 12 extending around the bushing 10, a flanges 34 extending from the sidewall 12, and a bottom plate 19. The bushing block 16 supplies molten glass material to the bushing 10. The sidewalls 12 may be formed in a generally planar formation, or, alternatively, they may have a non-linear shape, as depicted in FIG. 3. The bottom plate 19 is formed with a plurality of orifices (not shown) and a plurality of tips 15 positioned in fluid communication therewith so that the molten glass can be attenuated from the tips 15 to form glass filaments. In use, the molten glass flows from the bushing block 16, into the bushing 10, and through the tips 15 to form glass filaments.

Figure 4:
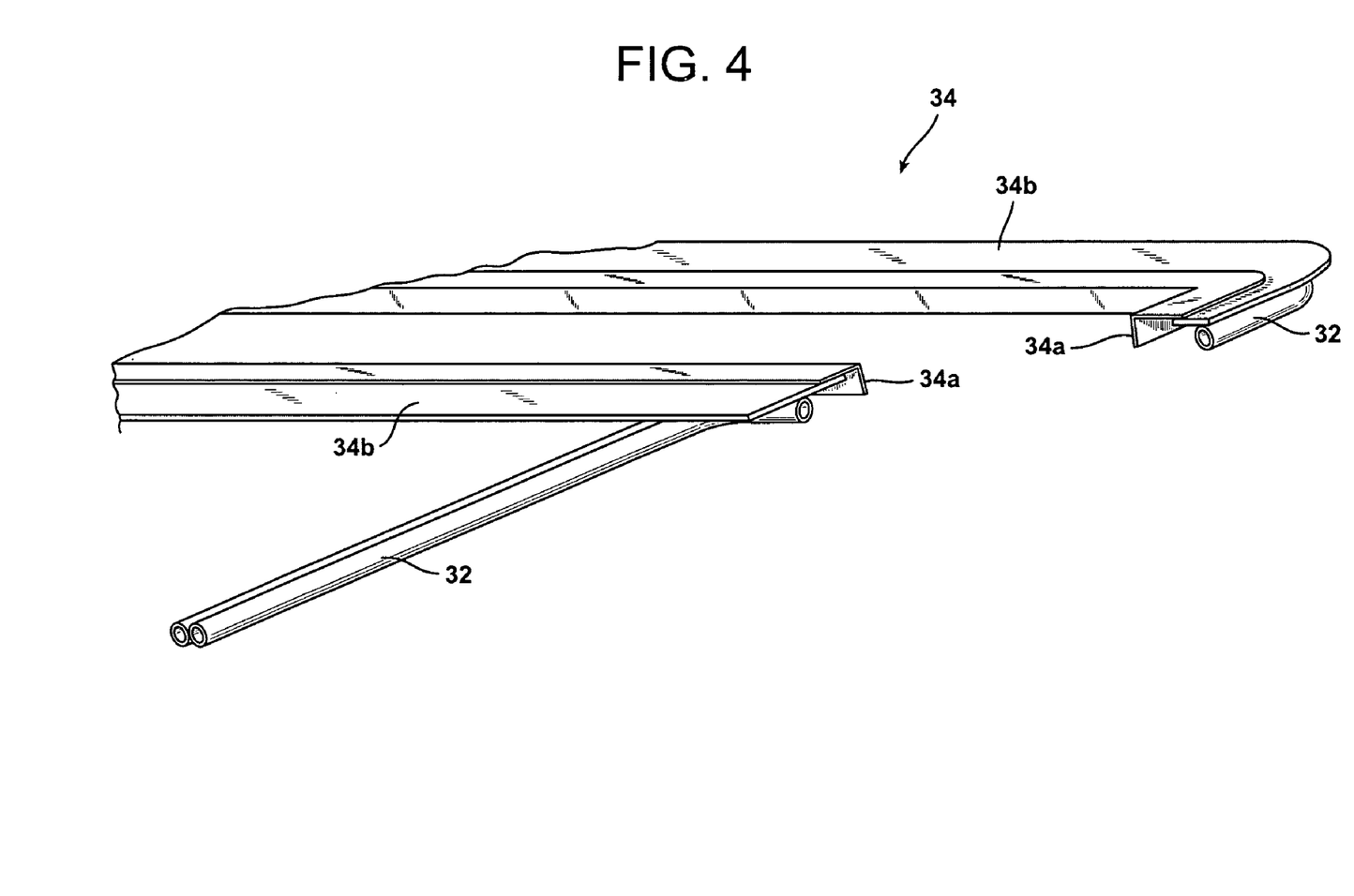
FIG. 4 is a partial perspective view of a cooling bushing flange according to the instant invention.
Figure 5:
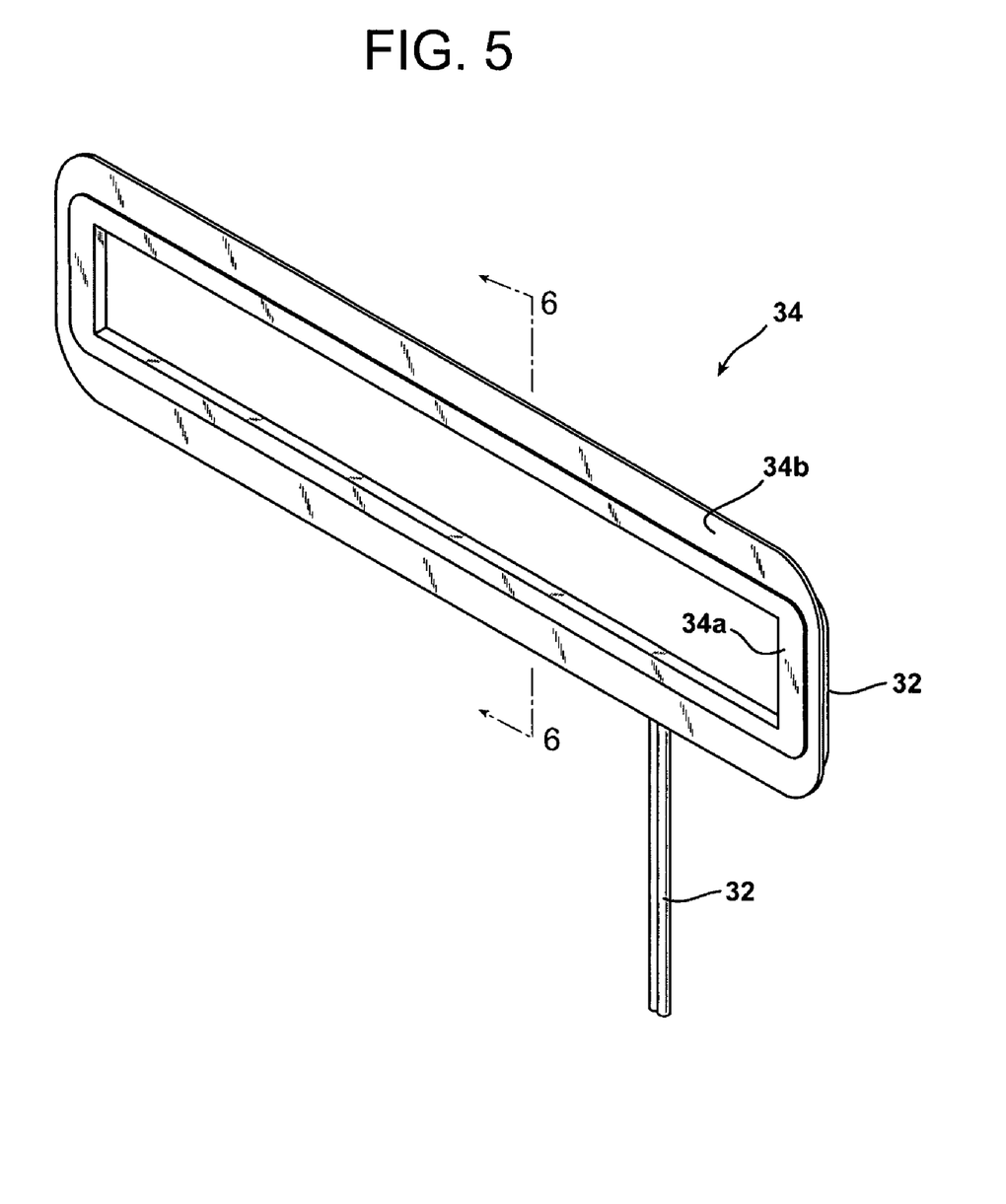
FIG. 5 is a perspective view illustrating the circumferential shape and positioning of the cooling tube on the reduced alloy flange.
Figure 6:
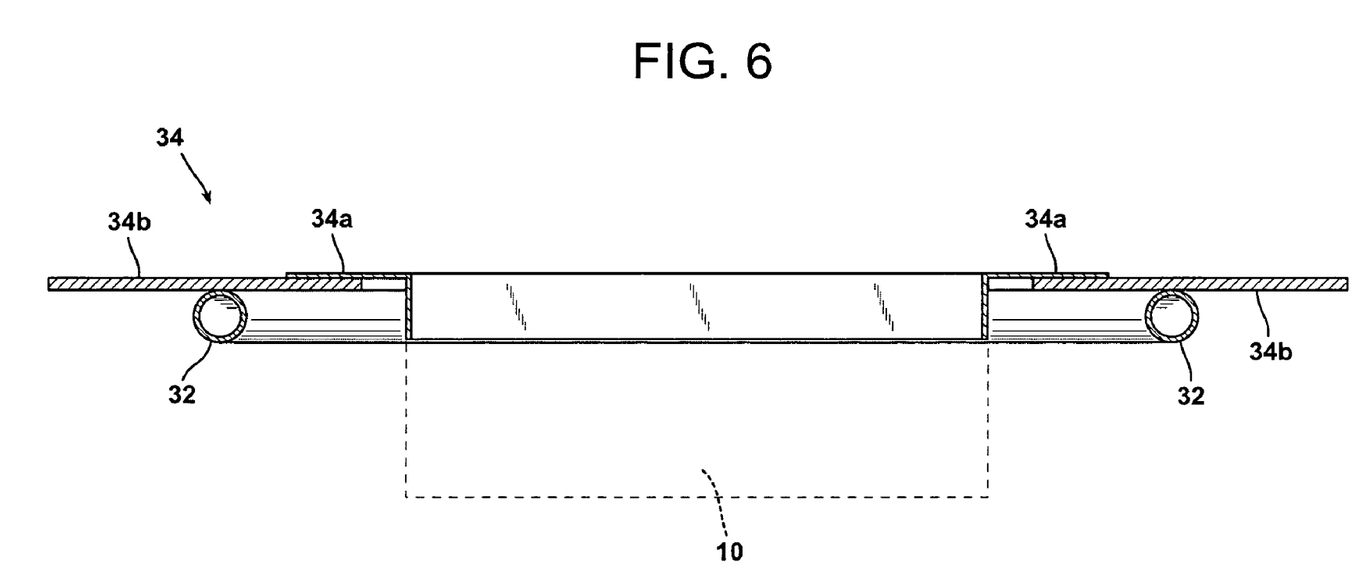
FIG. 6 is a cross-sectional view taken along lines 6-6 of FIG. 5, the top portion of the bushing being shown in phantom.

The inventive flange 34 is formed of a precious metal portion 34a extending from the bushing 10 and a non-precious metal portion 34b affixed to the precious metal portion 34a. The flange 34 is best seen in FIGS. 4 and 6. The flange is circumferential, as shown in FIG. 5, and generally surrounds the bushing 10. The non-precious metal portion 34b may be formed of a non-precious metal alloy, such as, but not limited to, stainless steels such as 310 stainless steel, 316 stainless steel, a metal-nickel alloy such as Inconel 600, 330 stainless steel, 353 stainless steel, or other high nickel content alloys. In conventional bushings, the flanges are formed entirely of a precious metal or a precious metal alloy (e.g., a platinum/rhodium alloy). In the inventive flange, the width of precious metal portion 34a of the flange 34 that extends outwardly from the bushing 10 is reduced in size (compared to conventional flanges) and a non-precious metal portion 34b is physically attached to the precious metal portion 34a. By reducing the amount of precious metal incorporated in the flange 34, a significant reduction in the overall cost of the bushing 10 and in the manufacture of glass fibers can be obtained. In the instant invention, the precious metal portion 34a of the flange 34 is a fraction of the size of precious metal conventional bushing flanges. In particular, there is up to a 40% reduction in the amount of precious metal included in the flange 34 of the present invention (e.g., a reduction from 1.25 inches in conventional flanges to 0.75 inches in the inventive flange 34).

The precious metal portion 34a of the flange 34 may extend a distance from about 0.5 to about 1.25 inches from the bushing 10 and the non-precious metal portion 34b may extend a distance from about 0.5 to about 2.0 inches from the precious metal portion 34a. In preferred embodiments, the flange 34 extends a distance from about 1.5 to about 1.75 inches from the bushing 10. The non-precious metal portion 34b of the flange 34 may be affixed to the precious metal portion 34a by known metal bonding methods, such as, for example, by soldering, brazing, or welding the two portions together. Alternatively, the non-precious metal portion 34b of the flange 34 can be independently supported in contact with the precious metal flange 34a to be in a heat transfer relationship therewith without being directly affixed thereto. For example, an intermediate heat conducting member (not shown) could be positioned between the precious metal flange 34a and the non-precious metal flange 34b to hold the non-precious metal flange 34b in a heat transfer relationship.

In order to reduce or prevent leakage of molten glass from the interface of the bushing block 16 and the bushing 10, a cooling tube 32 is positioned on the non-precious metal portion 34b of the flange 34 to create a thermal seal. Water flows through the cooling tube 32 to carry away heat absorbed by the cooling tube 32 transferred from the flange 34b and create a cooled area 38 at the interface of the bushing block 16 and the bushing 10 that has a temperature that is lower than the temperature at which the molten glass solidifies. The cooled area 38 surrounds the bushing 10. When the molten glass reaches the cooled area 38, the molten glass solidifies to prevent and/or significantly reduce any further flow of the molten glass material, thereby preventing molten glass from leaking out from the interface between the bushing block 16 and the bushing 10 into the workplace. By positioning the cooling tube 32 towards the outer or external end of the flange 34 on the non-precious metal portion 34b, the cold seal area 38 is positioned away from the primary glass flow within the bushing 10 in order to create better fiber forming conditions. Further, the thermal conduction properties of the precious metal portion 34a aids in the formation of a good thermal seal.

As shown in FIG. 3, the flange 34 is larger in size compared to conventional bushing flanges, and may extend a distance such that it is flush with the bushing block 16. The increased size of the flange 34 is due, at least in part, to the addition of the non-precious metal portion 34b. In addition, the increased size of the flange 34 results in an increased surface contact area and a resultant increased dispersion of heat from the bushing 10. Additionally, the increased surface contact area permits fast and efficient heat dispersion from the flange 34 into the atmosphere. By positioning the cooling tube 32 further outwardly from the bushing 10 than is known in conventional precious metal flanges, the thermal seal created by the cooled area 38 is located further outwardly from the bushing 10 to enhance the conditions for forming glass fibers within the bushing 10 and bushing block 16.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A cooling flange for a glass fiber forming apparatus including a bushing block holding a supply of molten glass, and a bushing in flow communication with said bushing block and having a plurality of orifices therein for the extraction of glass fibers from said bushing, the cooling flange comprising:
   an inner flange portion formed from a first material and being connected to said bushing to transmit heat from said bushing and said bushing block into said inner flange portion, said inner flange portion extending around a perimeter of said bushing at an interface between said bushing and said bushing block;
   an outer flange portion formed from a second material and being in a heat transfer relationship with said inner flange portion to receive heat therefrom, said outer portion extending around a perimeter of said inner flange portion; and
   a cooling tube affixed to said outer flange portion to circulate a cooling fluid therethrough and reduce a temperature of said outer flange portion below a temperature at which said molten glass solidifies and form a thermal seal between said outer flange portion and said bushing block to prevent molten glass from leaking past said bushing block,
   wherein said first material is a precious metal alloy and said second material is a non-precious metal alloy.

2. A cooling flange for a glass fiber forming apparatus including a bushing block holding a supply of molten glass, and a bushing in flow communication with said bushing block and having a plurality of orifices therein for the extraction of glass fibers from said bushing, the cooling flange comprising:
   an inner flange portion formed from a first material and being connected to said bushing to transmit heat from said bushing and said bushing block into said inner flange portion, said inner flange portion extending around a perimeter of said bushing at an interface between said bushing and said bushing block;
   an outer flange portion formed from a second material and being in a heat transfer relationship with said inner flange portion to receive heat therefrom, said outer portion extending around a perimeter of said inner flange portion; and
a cooling tube affixed to said outer flange portion to circulate a cooling fluid therethrough and reduce a temperature of said outer flange portion below a temperature at which said molten glass solidifies and form a thermal seal between said outer flange portion and said bushing block to prevent molten glass from leaking past said bushing block,
   wherein said second material is selected from the group consisting of stainless steel and a high nickel metal alloy and said first material includes a precious metal.

3. A cooling flange for a glass fiber forming apparatus including a bushing block holding a supply of molten glass, and a bushing in flow communication with said bushing block and having a plurality of orifices therein for the extraction of glass fibers from said bushing, the cooling flange comprising:
   an inner flange portion formed from a first material and being connected to said bushing to transmit heat from said bushing and said bushing block into said inner flange portion, said inner flange portion extending around a perimeter of said bushing at an interface between said bushing and said bushing block;
   an outer flange portion formed from a second material and being in a heat transfer relationship with said inner flange portion to receive heat therefrom, said outer portion extending around a perimeter of said inner flange portion; and
   a cooling tube affixed to said outer flange portion to circulate a cooling fluid therethrough and reduce a temperature of said outer flange portion below a temperature at which said molten glass solidifies and form a thermal seal between said outer flange portion and said bushing block to prevent molten glass from leaking past said bushing block,
   wherein said bushing block has an external dimension that is larger than a corresponding dimension of the interface between said bushing block and said bushing, said outer flange portion terminating at said external dimension of said bushing block.

4. The cooling flange of claim 3, wherein said outer flange portion is affixed to an underside surface of said inner flange portion such that said inner flange portion lies between said outer flange portion and said bushing block.

5. A glass fiber forming apparatus, comprising:
   a bushing block for holding a supply of molten glass, said bushing block having an interface opening through which said molten glass can flow;
   a bushing connected in flow communication with said bushing block to receive said molten glass therefrom, said bushing having a plurality of orifices through which said molten glass can flow to form glass fibers;
   an inner flange portion connected to said bushing and projecting outwardly therefrom terminating at a peripheral edge, said inner flange portion being formed of a first material, said bushing transferring heat into said inner flange during the formation of glass fibers;
   an outer flange portion attached to said peripheral edge of said inner flange portion and extending outwardly therefrom to terminate at a circumferential edge; said outer flange portion being made of a second material disparate to said first material; and
   a cooling tube attached to said outer flange portion through which cooling fluid can be circulated to create a cooled area at the interface of said bushing block and said bushing wherein said first material is a precious metal alloy and said second material is a non-precious metal alloy.

6. The glass fiber forming apparatus of claim 5, wherein said inner flange is located at said interface opening, and said bushing transfers heat into said inner flange portion glass fiber forming operations.

7. The glass fiber forming apparatus of claim 5, wherein said outer flange terminates at a peripheral edge of said bushing block.

8. The glass fiber forming apparatus of claim 5, wherein said second material is selected from the group consisting of stainless steel and a high nickel metal alloy and said first material includes a precious metal.

9. In a glass forming apparatus including a bushing block holding a supply of molten glass; a bushing in flow communication with said bushing block and having a plurality of orifices therein for the extraction of glass fibers from said bushing; and a flange extending outwardly from said bushing to form a thermal seal between said flange and said bushing block to restrict leakage of said molten glass from between said bushing block and said bushing, the improvement comprising:
   said flange being formed in two pieces including:
      an inner flange portion formed from a first material and being connected to said bushing to transfer heat from said bushing into said inner flange portion, said inner flange portion extending around a perimeter of said bushing at an interface between said bushing and said bushing block; and an outer flange portion formed from a second material and being connected to said inner flange portion to receive heat therefrom, said outer portion extending around a perimeter of said inner flange portion, said outer flange portion having a cooling tube affixed thereto for circulating a cooling fluid therethrough, wherein said inner flange portion extends a distance from about 0.5 to about 1.25 inches from said bushing, and wherein said outer flange portion extends about 0.5 to about 2.0 inches from said inner flange portion.

10. In a glass forming apparatus including a bushing block holding a supply of molten glass; a bushing in flow communication with said bushing block and having a plurality of orifices therein for the extraction of glass fibers from said bushing; and a flange extending outwardly from said bushing to form a thermal seal between said flange and said bushing block to restrict leakage of said molten glass from between said bushing block and said bushing, the improvement comprising:

said flange being formed in two pieces including:
an inner flange portion formed from a first material and being connected to said bushing to transfer heat from said bushing into said inner flange portion, said inner flange portion extending around a perimeter of said bushing at an interface between said bushing and said bushing block; and an outer flange portion formed from a second material and being connected to said inner flange portion to receive heat therefrom said outer portion extending around a perimeter of said inner flange portion, said outer flange portion having a cooling tube affixed thereto for circulating a cooling fluid therethrough, wherein said first material is a precious metal alloy and said second material is a non-precious metal alloy.

11. The glass fiber forming apparatus of claim 10, wherein said second material is selected from the group consisting of stainless steel and a high nickel metal alloy and said first material includes a precious metal.

* * * * *